(12) United States Patent
Garnier

(10) Patent No.: US 6,564,669 B1
(45) Date of Patent: May 20, 2003

(54) REMOTE HANDLING DEVICE

(75) Inventor: Andre Garnier, Loudun (FR)

(73) Assignee: Ste d'Innovations Techniques "S.I.T.", Chatellerault (FR)

( * ) Notice: Subject to any disclaimer, the term of this patent is extended or adjusted under 35 U.S.C. 154(b) by 0 days.

(21) Appl. No.: 09/631,836

(22) Filed: Aug. 3, 2000

(30) Foreign Application Priority Data

Aug. 13, 1999 (FR) .............................................. 99 10479

(51) Int. Cl.[7] .................................................. B25J 3/00
(52) U.S. Cl. ................................ 74/490.12; 74/490.05; 414/7; 411/380; 285/409
(58) Field of Search ................................ 74/491, 490.12, 74/490.05, 490.06, 525, 17.8; 414/1, 2, 3, 4, 5, 6, 7, 8; 411/380, 381; 285/409, 410

(56) References Cited

U.S. PATENT DOCUMENTS

| | | | | |
|---|---|---|---|---|
| 2,689,141 A | * | 9/1954 | Kiekhaefer | 285/409 |
| 3,212,651 A | * | 10/1965 | Specht et al. | 414/7 |
| 3,261,480 A | * | 7/1966 | Haaker et al. | 414/7 |
| 3,295,389 A | * | 1/1967 | Walischmiller | 74/491 |
| 3,425,569 A | * | 2/1969 | Haaker | 414/8 |
| 3,481,493 A | * | 12/1969 | Walischmiller | 414/7 |
| 3,507,163 A | | 4/1970 | Jennrich et al. | |
| 3,510,011 A | * | 5/1970 | Walischmiller | 414/7 |
| 4,474,518 A | * | 10/1984 | Critchley et al. | 414/8 |
| 5,522,625 A | * | 6/1996 | Flick et al. | 285/409 |

FOREIGN PATENT DOCUMENTS

| | | |
|---|---|---|
| FR | 1356029 | 6/1964 |
| FR | 86178 | 3/1966 |

* cited by examiner

Primary Examiner—David A. Bucci
Assistant Examiner—Colby Hansen
(74) Attorney, Agent, or Firm—Young & Thompson

(57) ABSTRACT

A remote handling device includes a master arm and a slave arm adapted to reproduce the movements of the master arm. The slave arm is located within a confinement chamber. The master arm is located outside the confinement chamber. The master and slave arms are interconnected by a mechanism passing through a wall of the confinement chamber. The master arm is connected by a connection tube to the mechanism. The master arm and the connection tube are connected to coupling and uncoupling means adapted to permit their modular connection or disconnection.

20 Claims, 4 Drawing Sheets

REMOTE HANDLING DEVICE

BACKGROUND OF THE INVENTION

This application corresponds to French application number 99.10479, filed Aug. 13, 1999, the disclosure of which is incorporated by reference herein.

The invention relates to a remote handling device, of the type comprising a master arm and a slave arm adapted to reproduce the movements of the master arm.

DESCRIPTION OF THE RELATED ART

In activities giving rise to the risk of nuclear, bacteriological or chemical type, personnel are separated from the products giving rise to such risks by placing these products within a confinement chamber. Operations are then carried out preferably by means of remote handling devices of known type, by transmitting the movements of the operator to a slave arm located within the confinement chamber.

Former remote handling devices, of the type described in FR 1.356.029 and FR 86.178 have been improved to facilitate maintenance.

This improvement leads to a differentiation of the technologies, into a so-called "American" technology and a so-called "European" technology.

The present invention relates to the remote handling device technology called "European".

Generally speaking, the slave arm located within the interior of the confinement chamber is adapted to be uncoupled from a mechanism passing through a wall of the confinement chamber and connecting the slave arm to a master arm located outside the confinement chamber and adapted to receive interactions from the operator.

In a known manner, the master arm is secured to a connection tube for connection to the mechanism passing through the wall of the confinement chamber, so as to copy the movements of the operator by the slave arm located within the confinement chamber.

In the technique usually used in Europe, remote handling devices comprise three separable parts: the slave arm located in the confinement chamber, the central passageway and the master arm secured to its connection tube.

These remote handling devices of known type generally are satisfactory, but are complicated to use, which decreases the productivity and renders maintenance of the remote handling devices relatively costly and difficult.

SUMMARY OF THE INVENTION

The invention has for its object to overcome the drawbacks of the known technique, by providing a new remote handling device permitting facilitating maintenance and increasing productivity of the activities carried out by this remote handling device.

The invention has for its object a remote handling device of the type comprising a master arm and a slave arm adapted to reproduce the movements of the master arm; said slave arm being located within a confinement chamber and being adapted to be uncoupled, said master arm being located outside the confinement chamber and said master and slave arms being connected by a mechanism passing through a wall of the confinement chamber; said master arm being connected to a connection tube to said mechanism passing through the wall of the confinement chamber, characterized in that the master arm and connection tube are connected to predetermined coupling and uncoupling means to permit their modular connection or disconnection, so as to facilitate the maintenance of the remote handling device and to increase productivity.

According to other characteristics of the invention:

said coupling and uncoupling means comprise guide means, the guide means comprise a guide pin with a conical engagement portion and a cylindrical portion adapted to engage in a complementary cylindrical bore, said coupling and uncoupling means comprise centering means;

the centering means comprise two concentric collars adapted to engage coaxially in each other, said coupling and uncoupling means comprise hitching and unhitching means, the hitching and unhitching means comprise a gripping bolt pivoting in a bearing and adapted to engage with a corresponding securement member, said coupling and uncoupling means comprise movement transmission means, said movement transmission means comprise coacting members, said coupling and uncoupling means comprise an intermediate adaptor block.

BRIEF DESCRIPTION OF THE DRAWINGS

The invention will be better understood from the description which follows, given by way of non-limiting example with reference to the accompanying drawings, in which.

DESCRIPTION OF THE PREFERRED EMBODIMENTS

Figure 1:
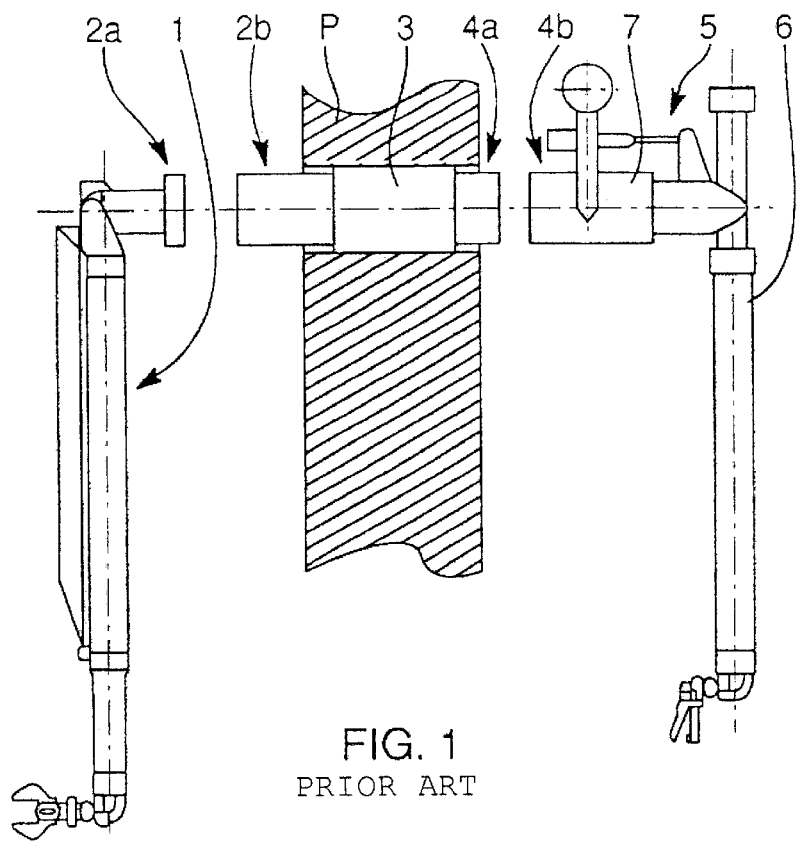
FIG. 1 is a schematic exploded elevational view partially cut away, of a remote handling device according to the prior art.

With reference to FIG. 1, a remote handling device of the known prior art is shown in the use position. The known remote handling device is shown in exploded position, on opposite sides of the wall P of a confinement chamber. A slave arm 1 is located within the confinement chamber, a first connection interface 2a, 2b with a mechanism 3 passing through the wall P of the confinement chamber, a second connection interface 4a, 4b of the traversing mechanism 3 with an assembly 5 of a master arm.

The assembly 5 of the master arm comprises a master arm 6 properly so-called and a connection tube 7 secured to the master arm 6.

The remote handling device known in the prior art can thus be separated into three parts: the slave arm 1, the traversing mechanism 3 mounted permanently through the wall P of the confinement chamber, and the assembly 5 of the master arm located outside the confinement chamber.

After mounting the three parts, the movement of the operator applied to the assembly 5 of the master arm is faithfully reproduced by the slave arm 1 located within the confinement chamber.

This arrangement is generally satisfactory, but in the case of a breakdown has the drawback of difficult maintenance due to the high weight of the assembly 5 of the master arm, which decreases the operative time and as a result the productivity of the remote handling device.

Figure 2:
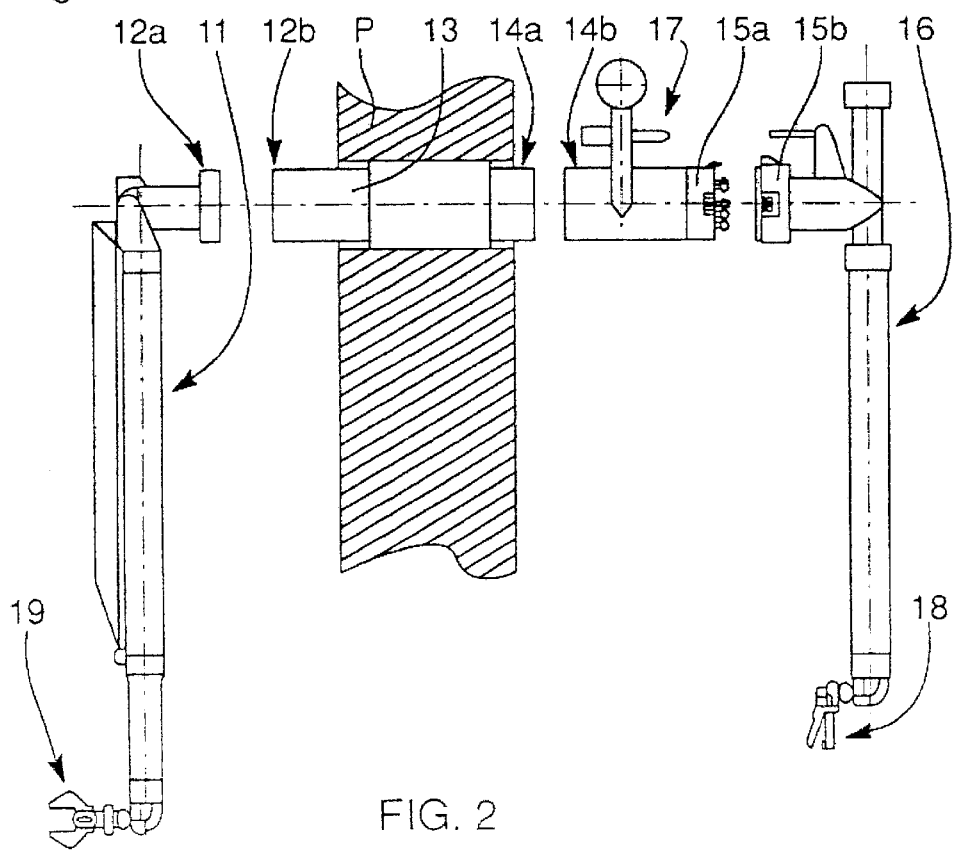
FIG. 2 shows schematically an exploded elevational view partially in cross-section of a remote handling device according to the invention.

With reference to FIG. 2, a remote handling device according to the invention comprises a slave arm 11 located within a confinement chamber comprising a wall P; a traversing mechanism 13 permanently mounted in the wall P and having a first interface 12b, 12a for connection with the slave arm 11 and a second interface 14a, 14b with a connection tube 17 located outside the confinement chamber and connected to a master arm 16 adapted to interact with the operator. The connection between the master arm 16 and the connection tube 17 results from the cooperation of means 15a, 15b for coupling and uncoupling which the connection tube 17 and master arm are respectively connected.

The coupling and uncoupling means 15a, 15b are predetermined to permit modular connection or disconnection of the elements 16 and 17, whilst permitting the transmission of movements of the operator from the handle 18 of the master arm 16 to the clamps 19 of the slave arm 11.

The coupling and uncoupling effected by the means 15a, 15b should thus not only permit a modular connection or disconnection, but also transmit with precision and in all directions the movements of the master arm 16 to the slave arm 11.

Figure 3:
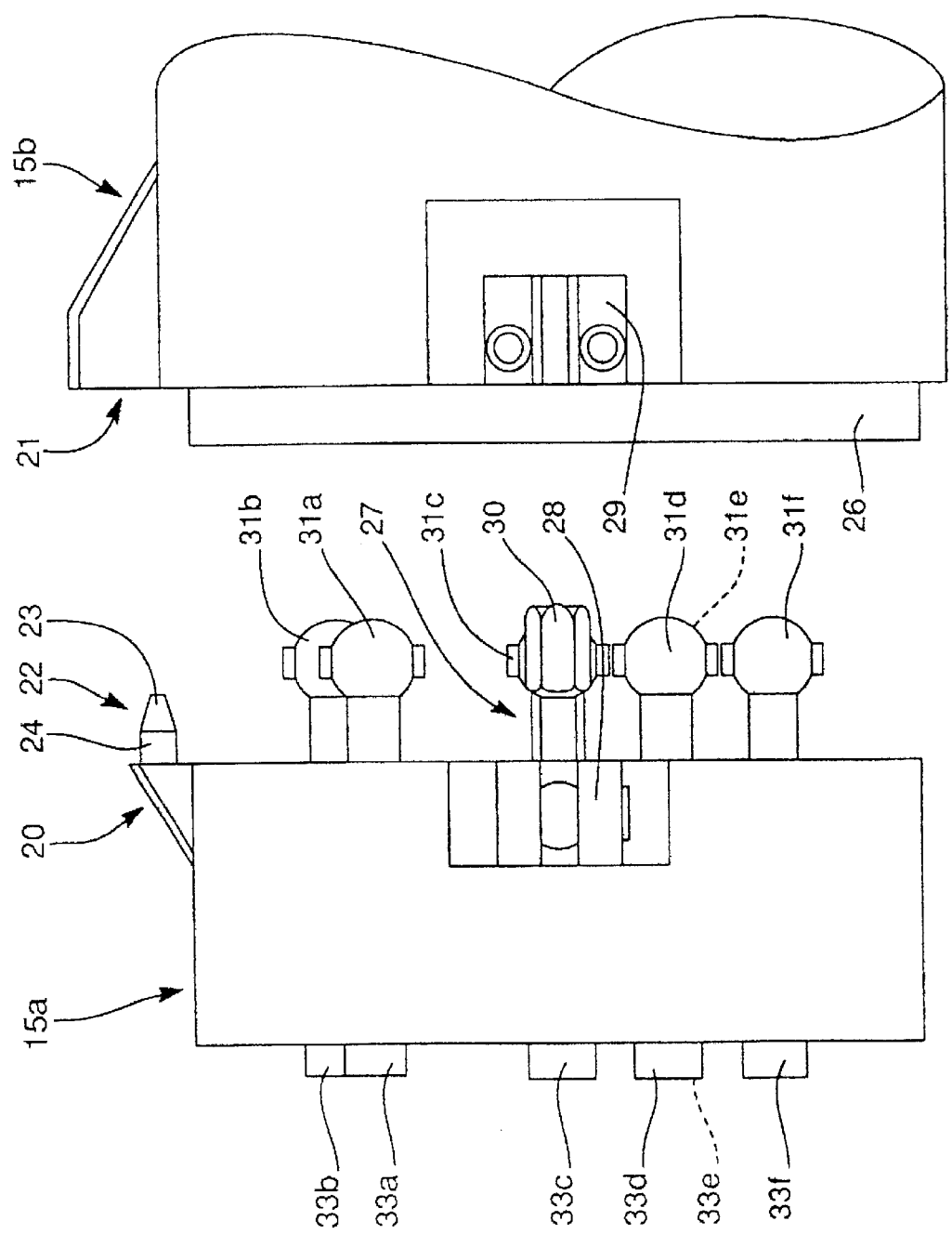
FIG. 3 shows schematically in fragmentary elevational view on an enlarged scale a remote handling device according to the invention.
Figure 4:
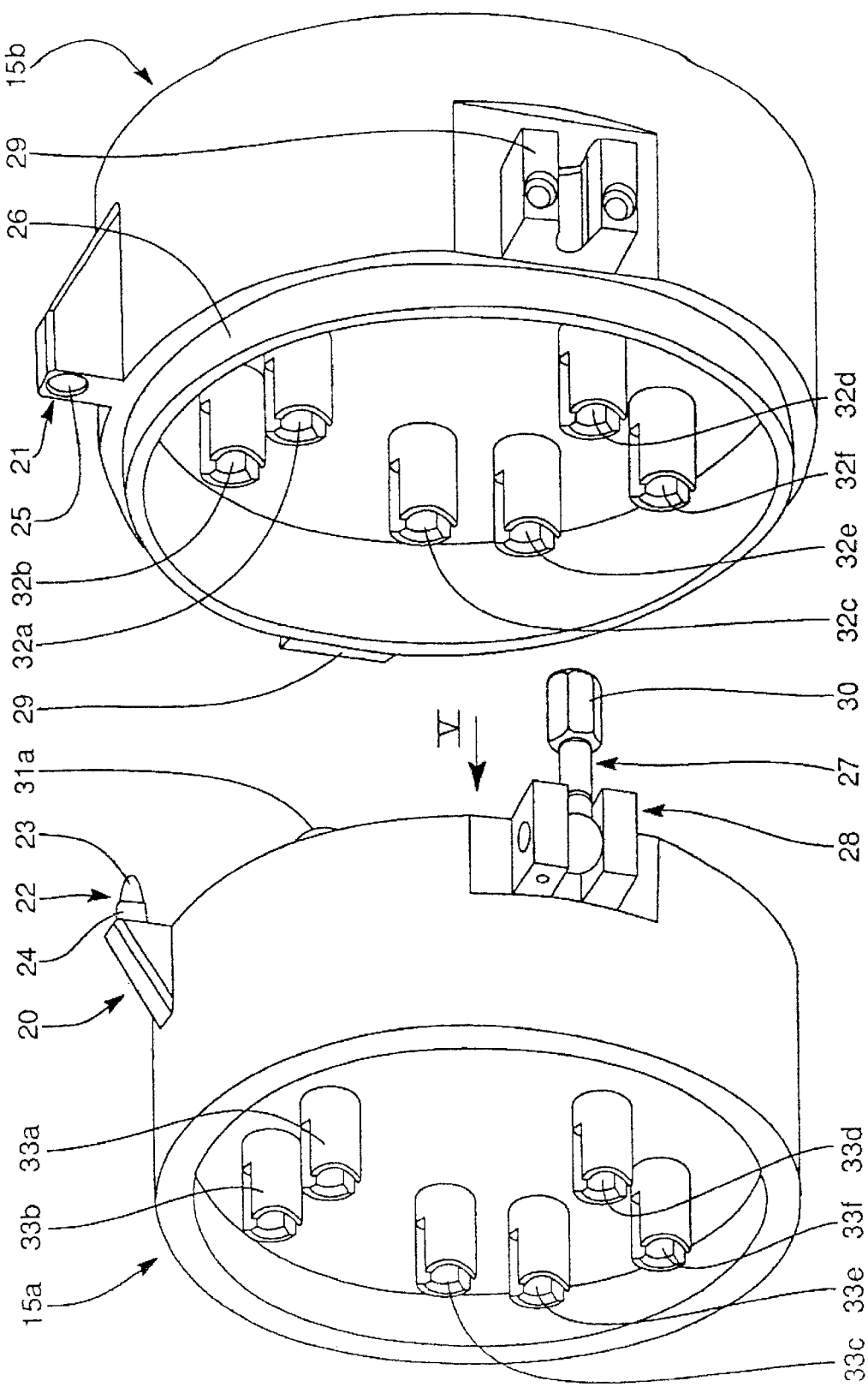
FIG. 4 shows schematically in fragmentary perspective view the coupling means of a remote handling device according to the invention.

With reference to FIGS. 3 and 4, identical or functionally equivalent elements to the elements of FIG. 2 are shown by reference numerals identical to the reference numerals of FIG. 2.

The coupling and uncoupling means 15a connected to the connection tube 17 is preferably in the form of an intermediate adaptor block.

The coupling and uncoupling means 15b located on the side of the master arm 16 remain preferably secured to the master arm 16.

To permit easy connection and disconnection, the guide means 20, 21 are provided, comprising for example a guide pin 22 with a conical engagement portion 23 and a cylindrical portion 24 adapted to engage in a cylindrical bore 25 forming a portion of the guide means 20 located on the side of the master arm 16.

Of course, the invention covers any modification comprising guiding or indexing means functionally equivalent to the guide means 20 and 21.

The means 15a is preferably designed to be centered on a small collar 26 of the means 15b: preferably, the centering is carried out by two concentric collars to engage coaxially one in the other, for example a small collar 26 and a cylindrical portion 35 of the means 15 adapted to fit on and about this small collar 26.

To ensure rapid connection and disconnection, the means 15a, 15b also comprise hitching and unhitching means. These hitching and unhitching means comprise for example a bolt 27 pivotally mounted in a bearing 28, adapted to engage behind a complementary securement member 29 so as to carry out a securement and gripping by screwing the nut 30 engaged behind this member 29.

Preferably, these hitching and unhitching means are regularly distributed about the periphery of the securement means 15a, 15b: in the case of two securement points, there is preferably provided hitching and unhitching means in diametrically opposed positions.

Finally, the means 15a, 15b comprise members for movement transmission, so as to permit copying the movements of the operator by the slave arm 11. These movement transmission means comprise coacting members 31a, 31b, 31c, 31d, 31e, 31f, for example comprising the spherical ends with cylindrical ferrules coacting respectively with the corresponding members 32a, 32b, 32c, 32d, 32e and 32f each having the shape of a bore with two diametrically opposed grooves.

This arrangement permits easy engagement and faithful transmission of movement.

In the case in which a means such as the means 15a for coupling and uncoupling is constituted in a form of an intermediate adaptor block, it is provided that the members 31a to 31f be connected respectively to corresponding ends 33a to 33f like members 32a to 32f located on the other means 15b for coupling and uncoupling. This arrangement ensures a line transmission of the movements of rotation applied by the hand of the operator to the master arm 16 and reproduced by the slave arm 11.

Figure 5:
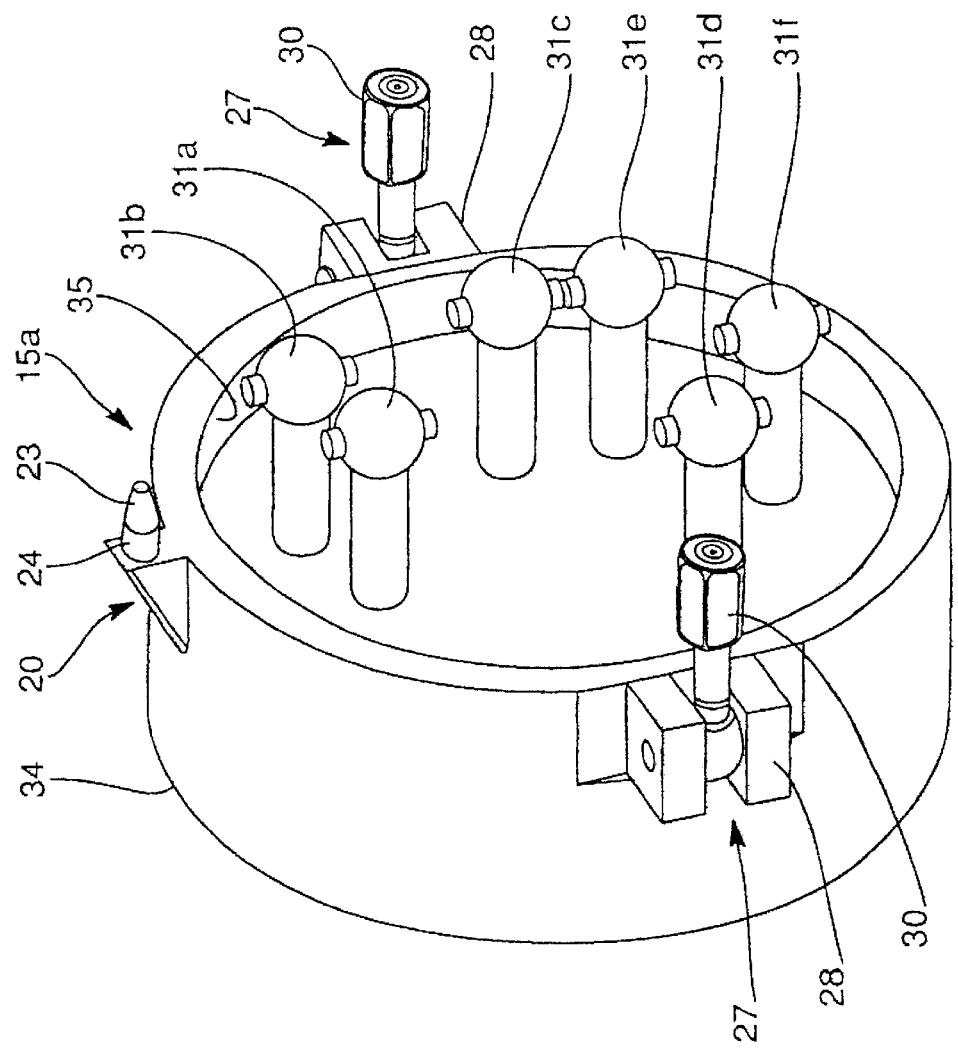
FIG. 5 shows schematically in a perspective view according to the arrow V of FIG. 4, an intermediate adaptor block for a remote handling device according to the invention.

In FIG. 5, a coupling and uncoupling means 15a comprises elements identical or functionally equivalent to the interface elements 15a of FIGS. 3 and 4, and designated by the same reference numerals as those of FIGS. 3 and 4.

The rear end 34 is mounted permanently on the connection tube 17 whilst the forward end comprises a cylindrical bore 35 adapted to cap the small collar 26 after engagement and coaction of the guide means 20 and 21 located respectively on the means 15a and 15b for coupling and uncoupling.

The invention described with reference to a particular embodiment is in no way limited, but covers on the contrary any modification of shape and change of embodiment within the scope and spirit of the invention. The essence is that the modular remote handling device can be separated into at least four elements facilitating maintenance and increasing the productivity of the remote handling device.

What is claimed is:

1. In a remote handling device comprising a master arm (16) and a slave arm (11) adapted to reproduce the movements of the master arm (16), said slave arm being located within a confinement chamber and being adapted to be uncoupled from the master arm, said master arm (16) being located outside the confinement chamber and said master and said slave arms (16, 11) being interconnected by a mechanism path (13) passing through a wall (P) of the confinement chamber, said master arm (16) being connected to a tube (17) for connection to said mechanism (13) passing through the wall (P) of the confinement chamber; the improvement in which the master arm (16) and the connection tube (17) are connected to a coupling and uncoupling means (15a, 15b) for Permitting modular coupling and uncoupling so as to facilitate maintenance of the remote handling device and to increase its productivity.

2. A remote handling device as claimed in claim 1, wherein said coupling and uncoupling means (15a, 15b) comprise guide means (20, 21).

3. A remote handling device as claimed in claim 2, wherein said guide means (20, 21) comprise a guide pin with a conical engagement portion (23) and a cylindrical portion (24) adapted to engage in a complementary cylindrical bore (25).

4. A remote handling device according to claim 1, wherein said coupling and uncoupling means (15a, 15a) comprise centering means (26, 35).

5. A remote handling device according to claim 4, wherein said centering means comprise two concentric collars (26, 35) adapted coaxially to engage within each other.

6. A remote handling device according to claim 1, wherein said coupling and uncoupling means (15a, 15b) comprise hitching and unhitching means (27, 29).

7. A remote handling device according to claim 6, wherein said hitching and unhitching means (27, 29) comprise a gripping bolt pivoting in a bearing (28) adapted to engage with a corresponding securement member (29).

8. A remote handling device according to claim 1, wherein said coupling and uncoupling means (15a, 15b) comprise movement transmission means (31a–31f, 32a–32f).

9. A remote handling device according to claim 8, wherein said movement transmission means comprise coacting members (31a–31f, 32a–32f, 33a–33f).

10. A remote handling device according to claim 1, wherein said coupling and uncoupling means (15a, 15b) comprise an intermediate adaptor block (15a).

11. A remote handling device, comprising:
a confinement chamber comprising a wall;
a master arm (16) located outside the confinement chamber;
a slave arm (11) located within the confinement chamber and coupled to the master arm by a traversing mechanism (13) passing through the wall of the confinement chamber,
the slave arm being adapted to reproduce the movements of the master arm (16);
a connection tube (17), located outside the confinement chamber, the connection tube connected to the traversing mechanism and to the master arm; and
a coupling and uncoupling means (15a, 15b) for connecting the master arm (16) to the connection tube (17) and through the connection tube to the traversing mechanism (13),
wherein the coupling and uncoupling means provides modular coupling and uncoupling of the master arm (16) from the connection tube (17).

12. A remote handling device as claimed in claim 11, wherein the coupling and uncoupling means (15a, 15b) comprise guide means (20, 21).

13. A remote handling device as claimed in claim 12, wherein the guide means (20, 21) comprise a guide pin with a conical engagement portion (23) and a cylindrical portion (24) adapted to engage in a complementary cylindrical bore (25).

14. A remote handling device according to claim 11, wherein the coupling and uncoupling means (15a, 15a) comprise centering means (26, 35).

15. A remote handling device according to claim 14, wherein the centering means comprise two concentric collars (26, 35) adapted coaxially to engage within each other.

16. A remote handling device according to claim 11, wherein the coupling and uncoupling means (15a, 15b) comprise hitching and unhitching means (27, 29).

17. A remote handling device according to claim 16, wherein the hitching and unhitching means (27, 29) comprise a gripping bolt pivoting in a bearing (28) adapted to engage with a corresponding securement member (29).

18. A remote handling device according to claim 11, wherein the coupling and uncoupling means (15a, 15b) comprise movement transmission means (31a–31f, 32a–32f) for transmitting all directions of movement of the master arm to the slave arm.

19. A remote handling device according to claim 18, wherein the movement transmission means comprise coacting members (31a–31f, 32a–32f, 33a–33f) which engage with corresponding members in the master arm.

20. A remote handling device according to claim 11, wherein the coupling and uncoupling means (15a, 15b) comprise an intermediate adaptor block (15a) provided with members which engage with corresponding members in the master arm to transmit all directions of movement of the master arm to the slave arm via the adaptor block, the connection tube, and the traversing mechanism.

* * * * *